(12) United States Patent
Meyer

(10) Patent No.: US 9,551,810 B2
(45) Date of Patent: Jan. 24, 2017

(54) LOOP DE-COUPLING CAPSULE FOR HOSTING ULTRA-SENSITIVE EXPERIMENTS IN A LOGGING SONDE

(71) Applicant: Lockheed Martin Corporation, Bethesda, MD (US)

(72) Inventor: Thomas J. Meyer, Corfu, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 741 days.

(21) Appl. No.: 14/044,563

(22) Filed: Oct. 2, 2013

(65) Prior Publication Data
US 2015/0090027 A1    Apr. 2, 2015

(51) Int. Cl.
*G01P 15/00*    (2006.01)
*G01V 11/00*    (2006.01)

(52) U.S. Cl.
CPC .................................. *G01V 11/002* (2013.01)

(58) Field of Classification Search
CPC .......... G01D 11/24; G01V 99/00; G01P 1/003
USPC .................... 73/152.02, 152.54, 152.59, 496
See application file for complete search history.

(56) References Cited

U.S. PATENT DOCUMENTS

| | | | |
|---|---|---|---|
| 4,461,997 A | 7/1984 | Ohmer | |
| 4,513,618 A | 4/1985 | Lautzenhiser | |
| 4,777,544 A | 10/1988 | Brown et al. | |
| 4,935,883 A * | 6/1990 | Hulsing, II | G01V 7/00 175/45 |
| 4,955,232 A * | 9/1990 | Lautzenhiser | G01V 7/02 73/382 G |
| 5,734,104 A | 3/1998 | Panenka | |
| 5,970,787 A * | 10/1999 | Wignall | G01V 7/16 73/152.54 |
| 6,615,660 B1 | 9/2003 | Feinberg et al. | |
| 7,036,609 B2 | 5/2006 | Michael et al. | |
| 2008/0015803 A1 | 1/2008 | Niebauer et al. | |
| 2008/0110258 A1 | 5/2008 | Meyer | |
| 2011/0061455 A1 | 3/2011 | Payton | |

OTHER PUBLICATIONS

International Search Report for International Application No. PCT/US2014/056802, dated Dec. 30, 2014. pp. 3.
International Preliminary Report on Patentability for International Patent Application No. PCT/US2014/056802, mailed Apr. 14, 2016, 5 pages.

* cited by examiner

*Primary Examiner* — Lisa Caputo
*Assistant Examiner* — Roger Hernandez-Prewit
(74) *Attorney, Agent, or Firm* — Withrow + Terranova, PLLC

(57) ABSTRACT

A capsule comprising two non-directly contacting halves enables otherwise coupling loads between experiment and gauging to be re-routed through the outer-most portable body (e.g. a logging sonde housing) having substantial inertia, thus serving to attenuate the parasitic loads. For co-located leveled experiment and gauging, a pair of concentric bearings (shaft in shaft) is utilized. Independent bearing sets and shock/vibration isolation support each capsule half within the outer sonde housing. A first half of the capsule supports the experiment, which the second half supports the gauging apparatus.

10 Claims, 6 Drawing Sheets

LOOP DE-COUPLING CAPSULE FOR HOSTING ULTRA-SENSITIVE EXPERIMENTS IN A LOGGING SONDE

FIELD OF THE INVENTION

This invention relates to decoupling force and measurement loops in the design of miniature, ultra-sensitive gravimeters for down hole use in well logging or permanent monitoring applications.

BACKGROUND OF THE INVENTION

During hydrocarbon drilling or mining, the gradient acceleration of a mass due to gravity is measured and used to gain information about the density of geological formations below the ground's surface. Measurement of the acceleration of a mass due to the force of gravity is performed by repeatedly dropping the mass and measuring variations of the drop of the mass during freefall. When performing the gravity measurement experiments, forces acting on the mass (force loop) and the forces affecting the instrumentation used to measure the gravity effects (measurement loop) may interact, causing part of the recoil force produced as a reaction to the gravitation force on the mass, to transfer to the measurement instrumentation, thereby resulting in self-induced interference and degradation of the measurement results.

Decoupling the force and measurement loops is a basic pursuit when designing ultra-precision instrumentation. Assuming the force and measurement loops could be completely decoupled, the gauging instruments would have no influence on the experiment and vice versa. However, in practice, absolute decoupling is impracticable and the design objective therefore becomes one of minimizing the self-induced disturbances or interference. For some applications, a measure of self-induced interference is tolerated. However, some experiments require extremely precise measurements and at such minute scale (for example 1 micro-Gal) that the self-induced interference produces noise to signal ratios that prevent the desired signal from being measurable. Certain precision experiments may be carried out in specially designed test platforms that operate in zero gravity environments such as in outer space. While this avoids the need to support the static weight of relevant apparatus, thereby providing an alternative means of decoupling, operating in zero gravity environments is expensive, forcing the experimenter to purchase space on a vehicle (e.g. a satellite, rocket, and/or space station) appropriate for conducting the experiment.

Space limitations are also a factor. The miniaturization of gravimeters requires spatial overlapping force and measurement loops, thereby compounding the difficulty in preventing crosstalk between the loops. Alternate means of reducing parasitic effects of force and measurement loop coupling are desired in an apparatus small enough to be used in drilling, logging, or monitoring operations, such as down hole in a sensor device such as a logging sonde,

SUMMARY

A capsule comprising two non-directly contacting halves enables otherwise coupling loads between experiment and gauging to be re-routed through an outer-most housing (e.g. a logging sonde) having substantial inertia, thereby attenuating the parasitic loads. An experiment vessel having non-contacting mass and gauging vessels houses an ultra-sensitive gravity experiment. In one embodiment, the experiment vessel is housed inside a capsule having two non-directly contacting members. Each of the mass vessel and the gauging vessel are in contact with a corresponding capsule member through two concentric bearing pairs. An additional set of two bearing pairs is disposed between a pressure housing and each of the capsule members. Recoil forces from the mass vessel are transmitted through the mass vessel to the corresponding bearings to the corresponding capsule member. The force continues to be transferred via a second set of bearings and possibly shock isolation system into the pressure housing, back through the second capsule member and through the bearings and possibly a second shock isolation system corresponding to the gauging vessel. As a result of the mass of the capsule members and pressure housing, inertia exists that attenuates the recoil force to a point where the interference induced by the recoil force does not mask the experimental result. The pressure housing (or sonde) may also be clamped to a well casing or lie flat on a horizontal or highly deviated section of casing, both thereby further increasing the sonde's effective inertia.

BRIEF DESCRIPTION OF THE DRAWINGS

The following detailed description may be better understood when taken in view of the accompanying drawings in which like numerals indicate like parts, and in which.

DETAILED DESCRIPTION

The force of gravity may be measured by the observation of a mass in freefall. Devices for providing a mass in freefall include devices which repeatedly lift and drop a mass while gauging instruments measure the gravitational effects resulting from each freefall. The gravitational effects being observed may have a magnitude on the order of 1 micro-Gal. Therefore, even minute sources of interference may obscure the result being observed. While lifting the test mass to its drop position, a test apparatus provides a supporting structure for supporting the mass. According to Newton's third law of motion, the force (action) of the free falling mass will create an equal and opposite collinear force (reaction). This reaction (recoil) of the falling mass is transferred to the supporting structure and introduces vibration and shock energy that is transferred throughout the device to the gauging instrumentation and parasitically acts on the gauging instrumentation. The energy of the recoil may be on the order of 1000 micro Gal. Thus, the recoil force produces a noise to signal ratio that effectively prevents measuring the gravitational effects of the falling mass.

This problem is highlighted when the measurement device is miniaturized, as the mass ratios of the object mass to the supporting structure are extremely small. In some high-value, ultra-high precision gravity experiments, the experimentation is performed in outer space, providing a zero gravity environment. Zero gravity tables may be designed to carry out experiments allowing tremendous isolation capabilities for harmful factors such as vibration. However, the customization of an experiment for execution on a satellite in space is very expensive and does not provide the ability to perform Earth bound experiments such as hydrocarbon surveying, where experiments are performed inside a logging sonde which is lowered into a borehole.

Figure 1:
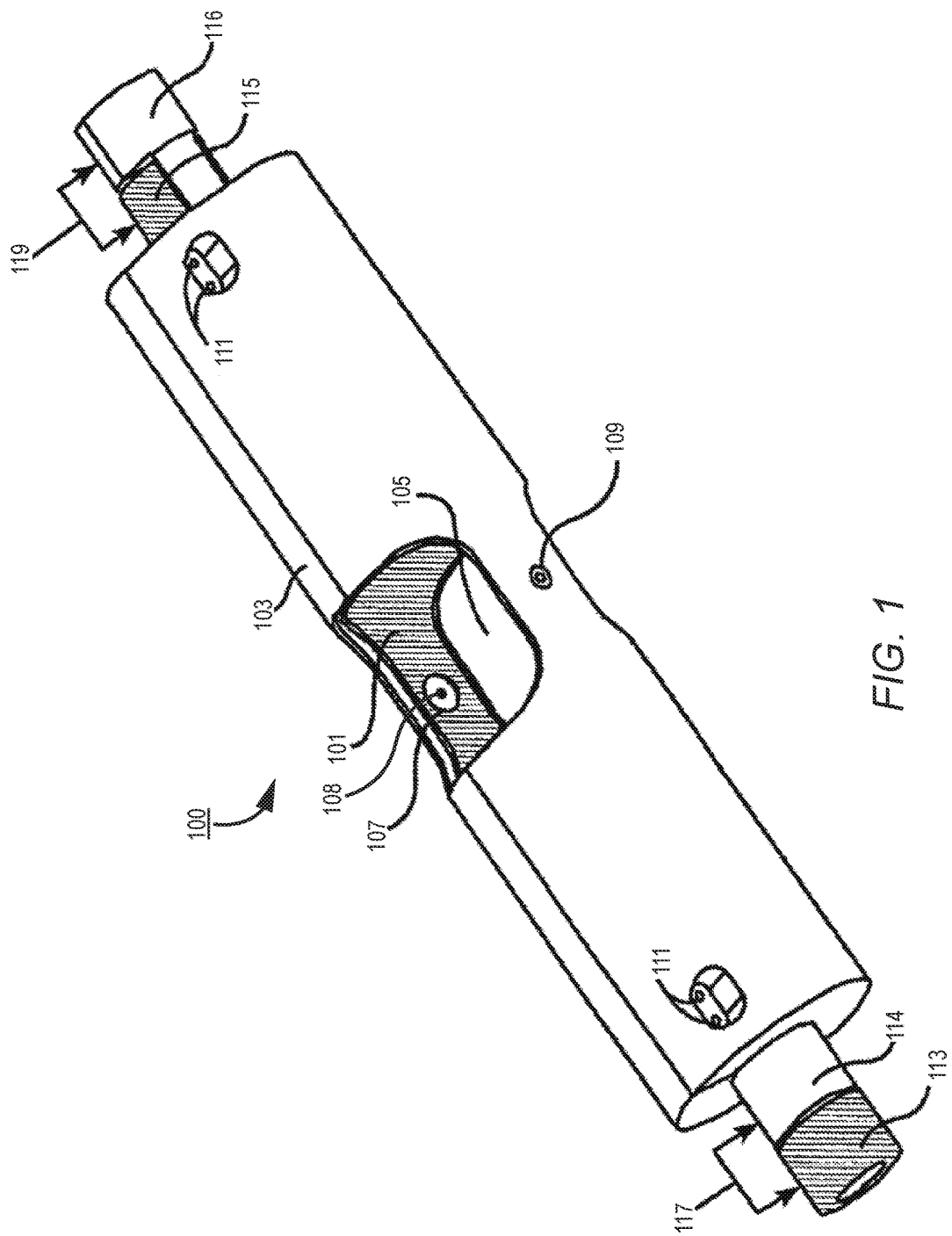
FIG. 1 is a perspective view of a capsule for decoupling measurement and force loops.

FIG. 1 is a perspective view of a capsule 100 for decoupling force and measurement loops in, for example, a freefall gravity experiment. The capsule 100 is comprised of two capsule members 101, 103. A first capsule member 101 is situated within the second capsule member 103. The two capsule members 101, 103, have a center region configured to provide a central payload area 105 for holding an experiment vessel (not shown) which includes the gauging instrumentation and freefall device for providing a test mass at freefall. The payload area 105 is supported by concentric bearing pairs installed in the walls of the first capsule member 101 and the second capsule member 103. The first capsule member 101 is adapted to hold a bearing installed in bore 107 show in FIG. 1. Bore 107 is configured to receive a bearing race, which in combination with another bearing race installed on the experiment vessel forms the first capsule member 101 bearing. A second bearing 109 is installed in the wall of the second capsule member 103. The second bearing 109 is concentric with first bearing 108 but not in direct contact with the first bearing 108. Accordingly, a gap is maintained between the first capsule member 101 and the second capsule member 103 and the concentric bearings 108, 109. The gap provides isolation between a mass vessel and a gauging vessel which in tandem form the experiment vessel. The gap is configured to be as small as possible while also considering thermal deformations and structural compliance under dynamic loads, providing the greatest interior volume for payload area 105. Second capsule member 103 substantially encapsulates first capsule member 101 and may be installed as two pieces that surround first capsule member 101. The two pieces are fastened at fastening holes 111 configured to receive a suitable fastener. The capsule 100 is tapered at its longitudinal ends. As shown in FIG. 1, a first tapered end defines a first capsule member shaft 113 and second capsule member shaft 114. A second tapered end defines a first capsule member shaft 115 and a second capsule member shaft 116. The first and second tapered ends are configured so that first member shafts 113, 115 do not contact second member shafts 114, 116.

The capsule 100 may be placed inside a logging sonde (not shown), which may be positioned down a borehole, such as the borehole of an oil or gas well. The logging sonde is a thick-walled cylindrical pressure housing, composed of a metal that provides the sonde with high mass and inertia. Bearings are installed in the inner walls of the logging sonde, placed at locations 117, 119 such that the bearings support the first member shafts 113, 115 and second member shafts 114, 116. At the first tapered end, a bearing pair contacts first and second member shafts 113, 114 at locations 117, while at the second tapered end, a second bearing pair contacts first and second member shafts 115, 116 at locations 119. As described above, the first and second capsule members 101, 103 are isolated from each other to separate the gauging vessel and mass vessel which are connected to the first and second capsule members 101, 103, respectively, through concentric bearings 108, 109. Bearing contact points 117, 119 provide a physical connection between first capsule member 101 and second capsule member 103 via the sonde housing. Recoil force generated by the dropping of the test mass within the mass vessel will transmit through first concentric bearing 108 to the first capsule member 101 through the bearing points 117, 119 into the sonde body, and back through the second capsule member 103, concentric bearing 109, and eventually arrive at the measurement vessel. By forcing the recoil energy to travel through the longest (longest in the sense of highest inertia) path possible throughout the logging sonde and capsule members 101, 103, the recoil force is significantly attenuated, reducing the parasitic effects of the recoil force on the gauging instrumentation. It is understood that the sonde could be permanently emplaced for long-term monitoring applications. Moreover, sondes may be clamped to well casings or lie flat on their inner walls in deviated sections, both effectively increasing the sonde's inertia to the advantage of this isolation concept. The bearings may be shock mounted in order to absorb some of the recoil energy on its way out from the experiment to the pressure housing, and then possibly again on its travel inward to the gauging apparatus through another shock mount subsystem.

Figure 2:
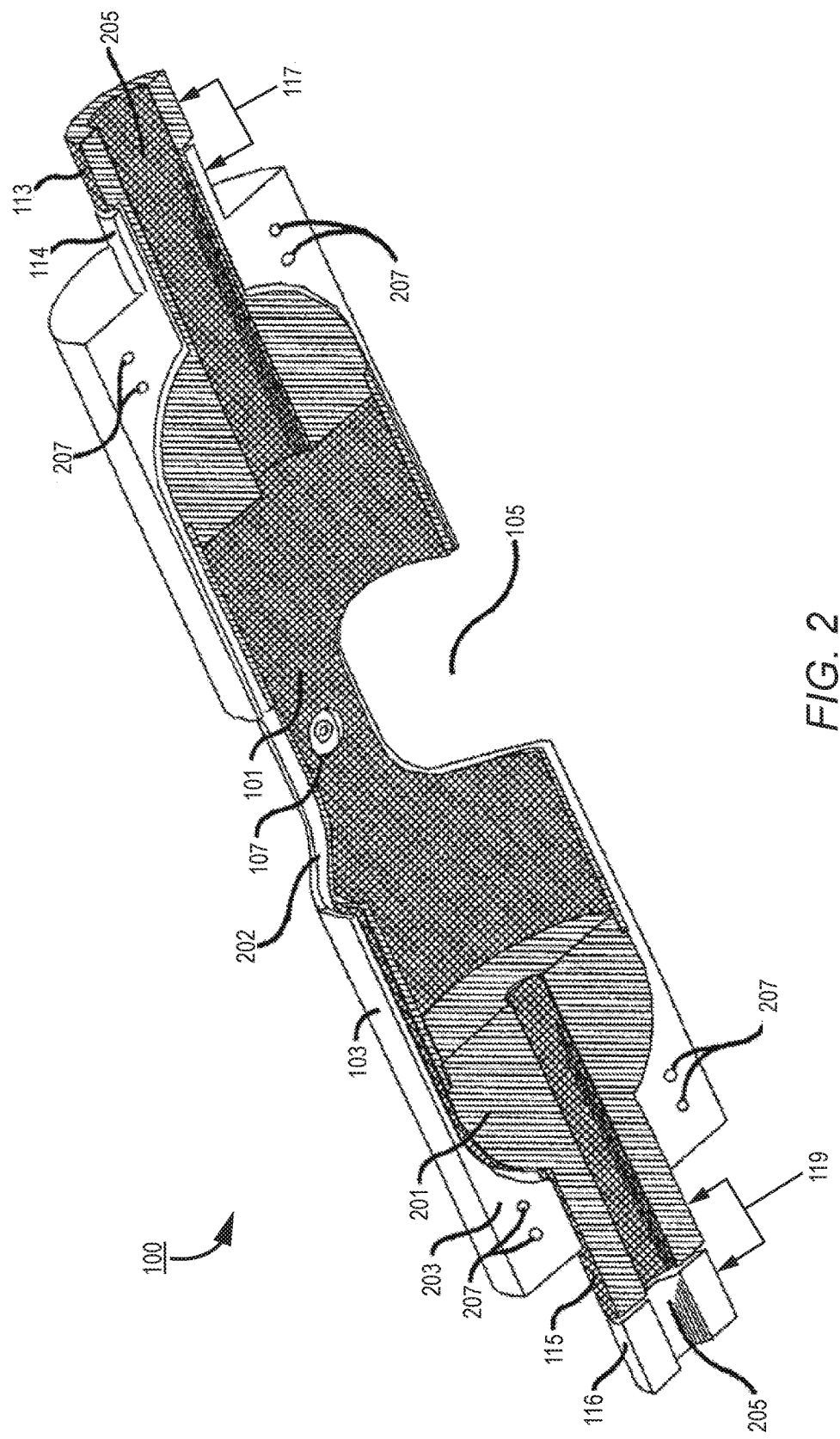
FIG. 2 is a sectional view of the decoupling capsule shown in FIG. 1 rotated 180 degrees about an axis that is perpendicular to a longitudinal axis of the decoupling capsule.

FIG. 2 shows a sectional view of capsule 100. Second capsule member 103, as described above with respect to FIG. 1, substantially encapsulates first capsule member 101. FIG. 2 depicts one half (piece) of the second capsule member 103, exposing fastener holes 207 into which fasteners (not shown) would be inserted from another capsule member piece to close second capsule member 103 around first capsule member 101. A gap 202 is maintained between the first and second capsule members 101, 103 which isolates the force from the measurement loop of the experiment vessel (not shown). First capsule member 101 includes a payload area 105 that it shares with second capsule member 103. First capsule member has a bore 107 which may be configured to hold a bearing that will support a shaft extending from one of either the mass vessel or gauging vessel making up the experiment vessel. First capsule member 101 comprises a solid portion 201 adjacent to the payload area 105 which provides mass and inertia to first capsule member 101. The increased mass causes greater attenuation to recoil force generated in the mass vessel as it is transmitted throughout the first capsule member 101. First capsule member 101 has tapered shaft regions 113, 115 at each longitudinal end. Shaft regions 113, 115 have hollowed regions 205 to provide a wire chase for feeding wires to the experiment vessel housed in the payload area 105. Wires, by way of non-limiting example, may include power connections to the experiment, optical fibers or signal wiring. Each first capsule member 101 shaft 113, 115 has an associated bearing point, 117, 119 where a bearing installed in an outer pressure housing, for example a logging sonde, contacts and supports the first capsule member 101.

Second capsule member 103 comprises a solid portion 203 which surrounds first capsule member 101 and provides mass and inertia to increase attenuation of the recoil forces generated within the mass vessel as they are transmitted throughout the second capsule member 103. Second capsule member 103 has tapered shaft regions 114, 116 at each longitudinal end. The center of the shaft regions 114, 116 have hollowed regions 205 to provide a wire chase for feeding wires to the experiment vessel housed in the payload area 105. Wires, by way of non-limiting example, may provide power connections to the experiment, optical fibers or signal wiring. Each shaft 114, 116 of second capsule has an associated bearing point, 117, 119 where a bearing installed in an outer pressure housing (e.g. a logging sonde) contacts and supports the second capsule member 103.

Figure 3:
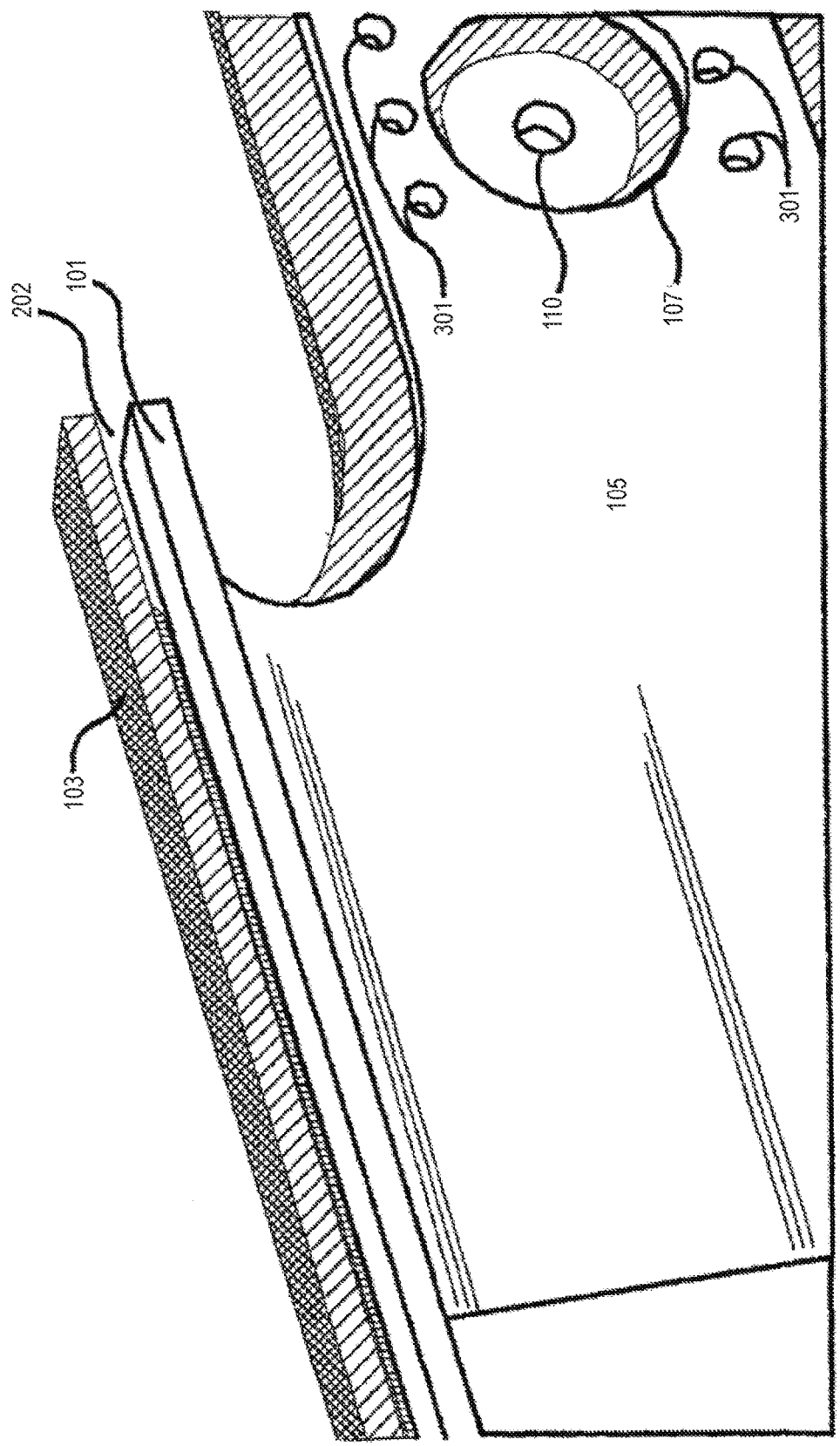
FIG. 3 is a sectional view of the payload area of a decoupling capsule of FIG. 1.

FIG. 3 is a cutaway sectional view of a capsule 100 showing the bearings for supporting an experiment vessel in payload area 105. The capsule has a first capsule member 101 and a second capsule member 103. The second capsule member 103 substantially encapsulates first capsule member 101. The first and second capsule members 101, 103, share a centralized payload area 105 which is adapted to hold an experiment vessel (not shown). The experiment vessel is comprised of two halves which are non-contacting and wherein, the first half is a mass vessel for housing a free falling test mass for measuring the absolute gravity effects on the falling mass and the second half is a gauging vessel for housing gauging instrumentation which measure the gravitational effects on the falling test mass. As described above, the mass vessel and the gauging vessel are non-contacting. That is, they are physically isolated to prevent vibration and shock energy from the recoil force of the free falling mass from affecting the gauging instrumentation. The isolation of the mass vessel and the gauging vessel is extended to the first and second capsule members 101, 103 which are also isolated through a gap 202 between the first capsule member 101 and the second capsule member 103.

Isolation of the mass vessel and gauging vessel is extended to the first and second capsule members 101, 103 by means of concentric bearings mounted within walls of the first and second capsule members 101, 103. Second capsule member 103 includes a bearing race 110 for receiving a vessel bearing mounted on, for example, a concentric shaft corresponding to one of either the mass vessel or the measurement vessel. First capsule member 101 includes a bore 107 for receiving a bearing race (not shown) which may be adapted to receive a concentric shaft of the vessel associated with the first capsule member 101. Mounting holes 301 may be provided to allow the installation of a commercial off the shelf (COTS) bearing race, or alternatively, the bearing may be a pressed in bearing type which is pressed into the bore 107 provided in the wall of the first capsule member 101.

The concentric shafts of the mass and gauging vessels allow for both halves of the experiment vessel to rotate within the concentric bearings 108, 109 while maintaining a gap between the vessels. The independent rotation about the axis defined by the concentric bearings allows the experiment vessel to be maintained in a plumb and level position while the experiment is lowered through a borehole inside a logging sonde. The shafts of the mass vessel and the gauging vessel may be arranged as a shaft within a shaft, wherein the two shafts rotate in synchronization but are non-contacting to maintain the force and measurement loop isolation.

Figure 4:
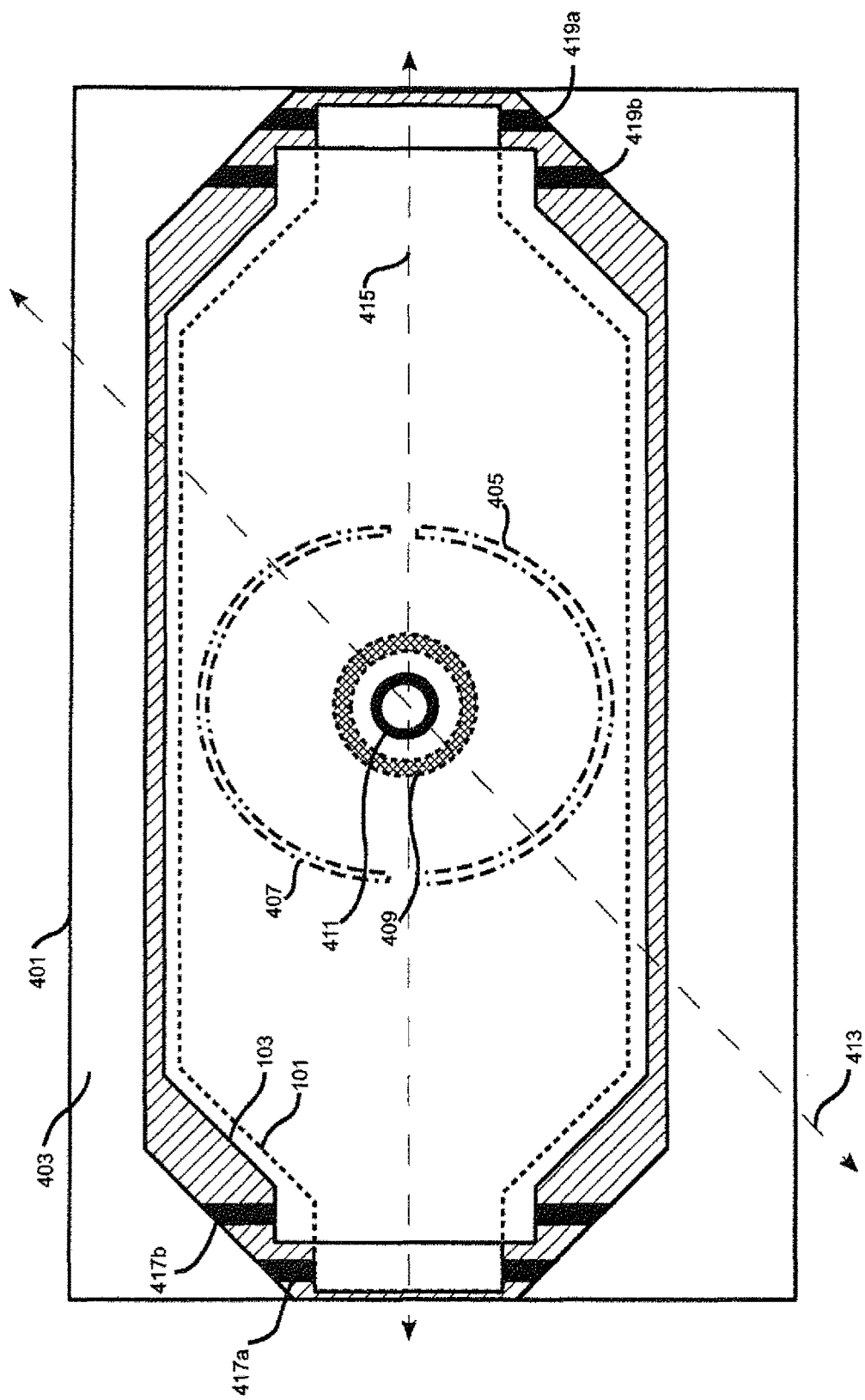
FIG. 4 is a schematic cross sectional diagram of the decoupling capsule of FIG. 1 including an experiment vessel within the capsule's payload.

FIG. 4 is a sectional view of a decoupling capsule installed in a logging sonde. A logging sonde 401 forms a high mass pressure housing 403 surrounding a decoupling capsule. The sonde 401 provides a high mass structure with high inertia that provides attenuation of the recoil force generated by a free falling mass used to measure acceleration of the mass due to gravity. Near the longitudinal ends of the sonde 401, a bearing pair 417, 419 is installed. In FIG. 4, the leftmost end shows bearing pair 417, and the rightmost end is shown containing bearing pair 419. Bearing 417a contacts and supports a first capsule member 101. Similarly, at the other end, bearing 419a contacts and supports the first capsule member 101. First capsule member 101 is substantially encapsulated by a second capsule member 103 which is in contact with and supported by bearing 417b at the leftmost end and bearing 419b at the rightmost end of the sonde 401. First and second capsule members 101, 103 share a common central payload area which is used to house an experiment vessel. Gauging instrumentation used to measure gravity in the experiment are housed in a gauging vessel 405 which forms one half of the experiment vessel. An apparatus for providing repeated freefall of a test mass is housed in a mass vessel 407 which forms the remaining half of the experiment vessel. The first capsule member 101, includes a bearing pair, one of which is shown in FIG. 4 as bearing 409. The other bearing in the pair is on the opposite side of the payload area to form an lateral axis 413 about which the experiment vessel may rotate. A shaft extending from one of either the mass vessel 407 or the gauging vessel 405 is received by bearing 409 allowing the vessel to rotate about the axis defined by its shaft and bearing 409.

The second capsule member 103, includes a second bearing pair, the second bearing pair concentric with the first bearing pair of the first capsule member 101. One of the pair of second capsule member 103 bearings is shown in FIG. 4 as bearing 411. The bearing pair defines a lateral axis 413 about which the experiment vessel may rotate. A shaft extending from the other of either the mass vessel 407 or the gauging vessel 405 is received by bearing 411 allowing the vessel to rotate about the axis 413 defined by its shaft and bearing 411. The shafts of the mass vessel and the gauging vessel are isolated from each other, for example, the shafts may be concentrically arranged as a shaft within a shaft. The entire experiment vessel including the mass vessel half 407 and the gauging vessel half 405 may rotate about lateral axis 413 while maintaining isolation between the vessel halves due to the fact that one of the vessel halves is in contact with the first capsule member 101 through bearing pair 409 and the other vessel half is in contact with the second capsule member 103 through bearing pair 411.

A longitudinal axis 415 is formed along the length of the first and second capsule members 101, 103 which allows for rotation about the longitudinal axis 415 of the first and second capsule members 101, 103 via bearing pairs 417, 419. The rotation of the first capsule member 101 must be synchronized with the rotation of the second capsule member 103 to maintain the concentricity of the payload bearing pairs 409 and 411. The lateral axis 413 is orthogonal to the longitudinal axis 415, providing two perpendicular axes about which the experiment vessel may rotate, thereby ensuring the experiment vessel may be positioned level and plumb with respect to gravity (i.e. vertical with respect to gravity) regardless of the physical orientation of the logging sonde 401 within a borehole.

Figure 5:
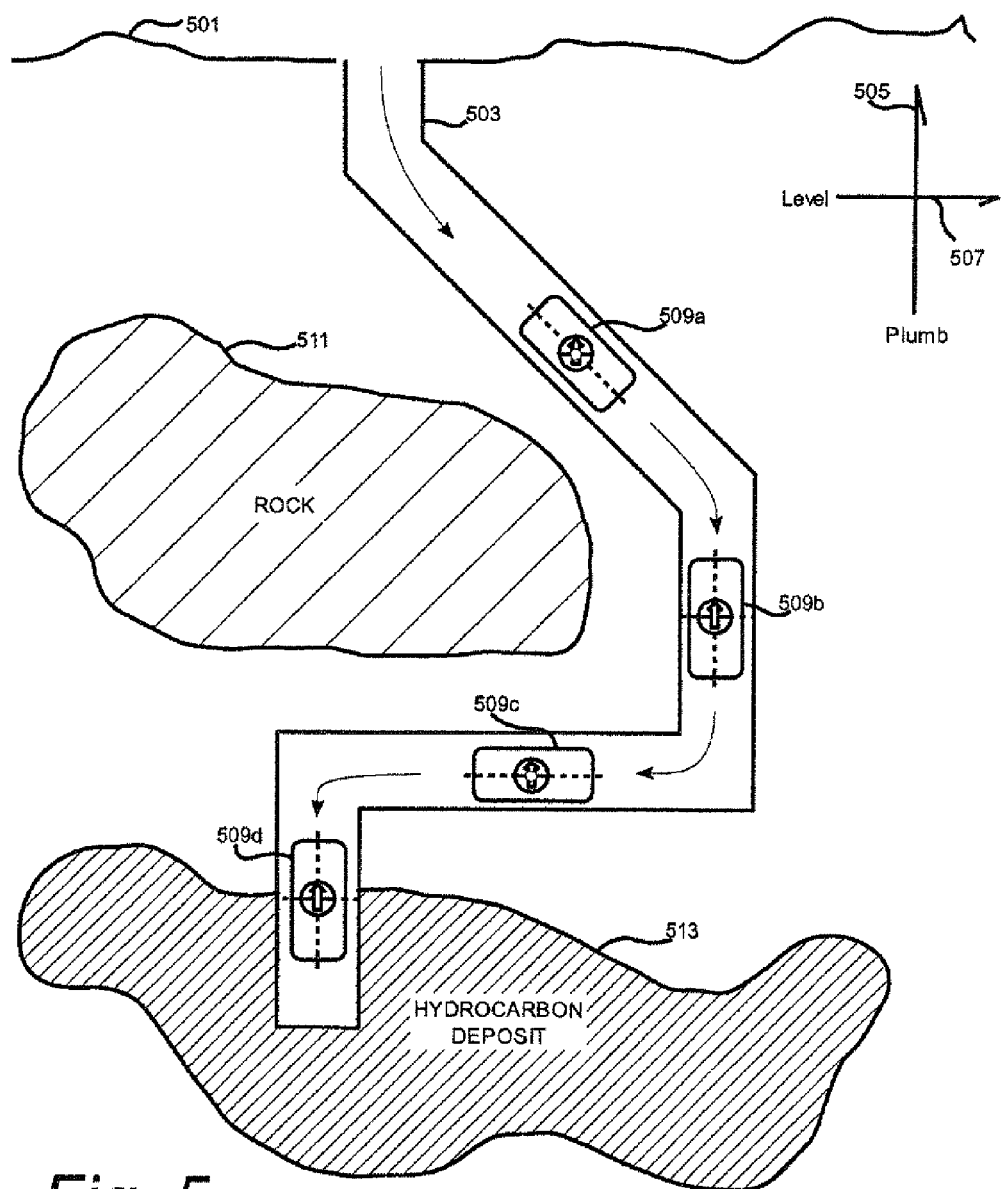
FIG. 5 is an illustration of an exemplary logging sonde equipped with a decoupling capsule at various positions in a borehole.

FIG. 5 is an illustration of a borehole 503 utilizing a logging sonde equipped with a de-coupling capsule. By way of non-limiting example, a borehole 503 is drilled through the Earth's surface 501 in order to extract oil or other hydrocarbon deposits 513 located beneath the surface 501. It is conceivable that certain obstacles may stand between the borehole 503 entry point at the surface 501 and the target hydrocarbon deposit 513. The exemplary illustration of FIG. 5 shows an obstacle such as a rock formation 511 under the Earth's surface between the straight line path between entry point 503 and the hydrocarbon deposit 513. A deviated (i.e. non-vertical) path may be implemented wherein the borehole 503 may be drilled at varying angles for certain distances, to route the borehole 503 around the obstacle. A logging sonde denoted generally as 509, may be placed down hole to provide information regarding the geological features surrounding the borehole 503. During the descent down the borehole 503, the sonde 509 will assume various positions as it is lowered further down the borehole 503. For example, at position 509a, the sonde is positioned at a 45 degree angle, following the borehole 503 as it begins to change course to avoid rock formation 511. Once around the obstacle 511, the borehole 503 is vertical, causing the sonde to assume a vertical position 509b. Once the obstacle 511 is passed in a vertical direction, the borehole 503 proceeds horizontally beneath the obstacle 511, to allow access to the optimal access point of hydrocarbon deposit 513 for extraction of the oil or other hydrocarbon. As the sonde 509 passes the horizontal region, the sonde is in position 509c, in a position horizontal to the longitudinal axis of the sonde 509. When the sonde reaches position 509d, the sonde is once again in a vertical position as the borehole 503 turns downward in its final approach to the hydrocarbon deposit 513. Although the above example shows a well deviation in response to an obstacle, it is understood that wells are typically deviated in order to reach out to several locations from a common access or entry point near the surface. This may be referred to as drilling laterals and is common offshore, or to reach beneath a metropolitan area where drilling operations at the surface may prove difficult due to issues of accessibility. Further, wells may be deviated in order to maintain a good "pay zone" as long as possible. This is often referred to as maximizing reservoir contact via directional drilling. In any event, the logging sonde with de-coupling capsule according to the present disclosure may be implemented in both deviated and vertical well paths.

The capsule 100 described in FIGS. 1-4 may be installed in sonde 509 to provide freefall absolute gravity experiments used to measure gravitational effects relating to the surrounding geological structures down borehole 503. To facilitate freefall, the experiment vessel (the circle within each sonde 509a-509b) must be level 507 with respect to the surface 501 and must be plumb 505 with respect to absolute gravity. The plumb and level orientation must be maintained throughout the sonde's 509 descent through the borehole 503 as indicated by the arrow inside each sonde 509a-509d. The de-coupling capsule (100 as shown in FIG. 1) provides two, orthogonal rotational axes between a first and second capsule member (101, 103 as shown in FIG. 1), that allow rotation of the capsule in a longitudinal and lateral direction as described above regarding FIG. 4, which provides the ability to maintain the experiment vessel inside the capsule at plumb 505 and level 507 at any point in the deviated path of the borehole 503.

Figure 6:
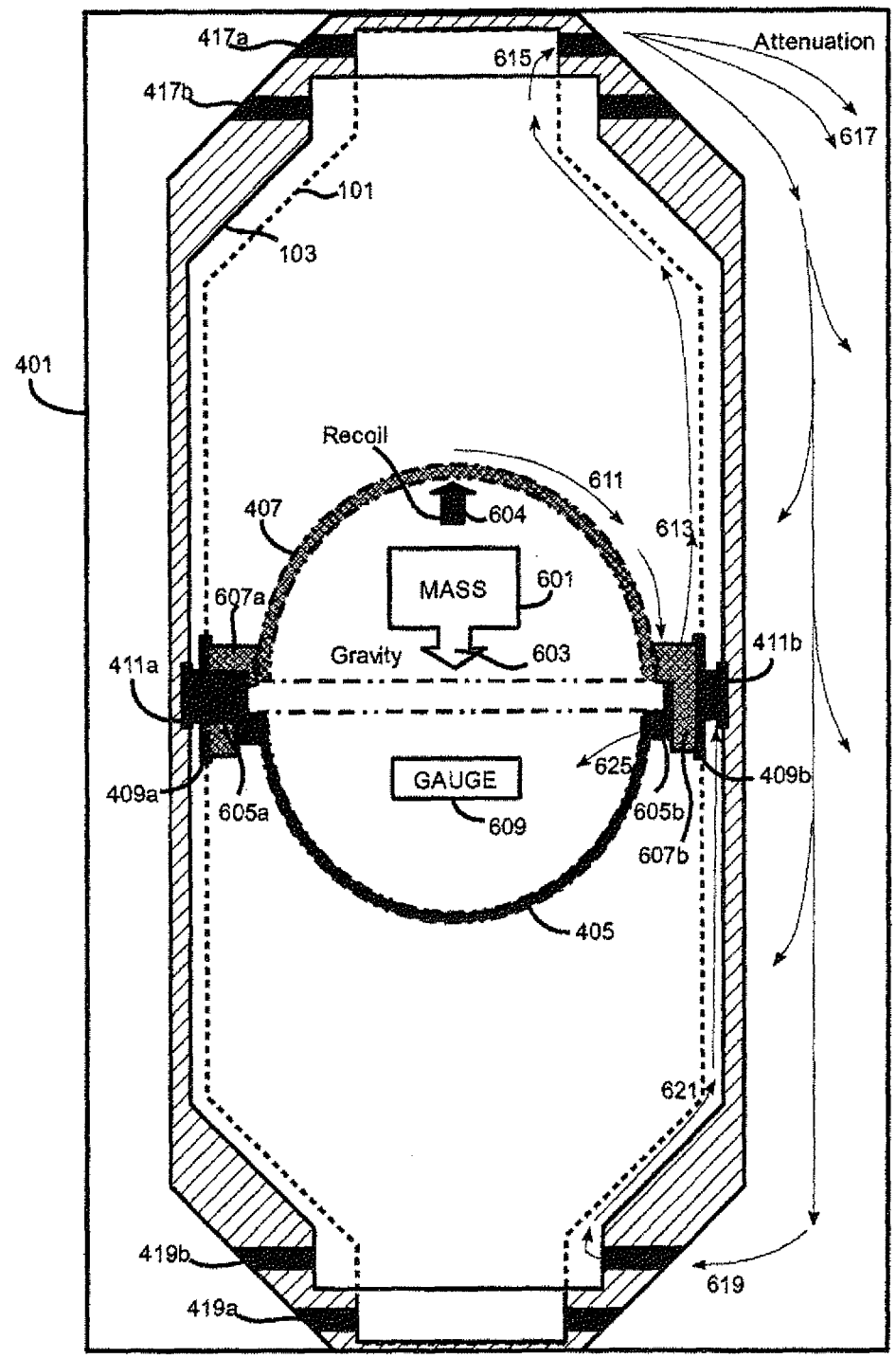
FIG. 6 is a schematic cross sectional view of the decoupling capsule and experiment vessel.

Referring to FIG. 6, a sectional view of a logging sonde 401 equipped with a decoupling capsule and experiment vessel is shown. Logging sonde 401 comprises a pressure housing having an internal cavity for holding test equipment as it is lowered down the borehole of a well, such as, by way of example, an oil well. The cavity within logging sonde 401 is tapered along its longitudinal ends. Corresponding to each tapered region, a pair of bearings 417, 419 is installed to contact and support a first capsule member 101 and a second capsule member 103, providing decoupling in a manner described herein. Bearing 417a contacts and support first capsule member 101 at the first end of sonde 401, while bearing 419a supports the first capsule member 101 at the opposite end of sonde 401. Bearing 417b contacts and support the second capsule member 103 at the first end of sonde 401 while bearing 419b supports the second capsule member 103 at the opposite end of sonde 401. First capsule member 101 and second capsule member 103 are separated by a gap which provides isolation of vibration and shock produced by the recoil force 604 generated by dropping test mass 601 within a mass vessel 407. Mass vessel 407 houses a test structure for repeatedly dropping mass 601 to measure the differential gravitation effects on the mass 601 in freefall. The first and second capsule members 101, 103 may be rotated about their longitudinal axes via bearings 117, 119. Rotation of the first capsule member 101 must be synchronized with the rotation of the second capsule member 103, to maintain alignment of concentric bearings 409, 411 which support the experiment vessel 407, 405 in the payload area of the capsule.

Bearings 411a, 411b are installed in the wall of second capsule member 103 to define a lateral axis passing through the experiment vessel. Bearings 409a, 409b are installed in the walls of the first capsule member 101 and are concentric with bearings 411a, 411b along a lateral axis. The experiment vessel is comprised of two non-contacting halves. The first half houses an apparatus including the mass 601 which is repeatedly dropped so that its gravitational acceleration may be measured during freefall. This half is referred to as the mass vessel 407. The other half of the experiment vessel houses the gauging instrumentation 609 needed for measuring the gravitational forces 603 acting on mass 601. This half is referred to as the gauging vessel 405. The mass vessel 407 and gauging vessel 405 are non-contacting and provide isolation of vibration and shock due to recoil force 604 generated equally and opposite to the force of gravity 603 created from the repeated lifting and dropping of mass 601 during the experiment.

The experiment vessel is supported by concentric bearings 409, 411 which maintain isolation of the mass vessel 407 and the gauging vessel 405. Each half of the experiment vessel has an associated shaft extending along the lateral axis defined by the concentric bearings 409, 411. The shafts of the non-contacting halves may be configured as a shaft within a shaft, providing support of each vessel half, while maintaining isolation between the halves. For example, bearings 411a and 409a shown on the left side of the experiment vessel, show a partial cutaway view showing internal shaft 605a of gauging vessel 405 extending through bearing 411a. Internal shaft 605a is configured to rotate independently and within outer shaft 607a, which is associated with mass vessel 407. Internal shaft 605a extends through bearing 411a in the wall of second capsule member 103 and is non-contacting with outer shaft 607a which extends through bearing 409a in the wall of first capsule member 101. This configuration maintains isolation of the mass vessel 407 and the gauging vessel 405.

Referring to the right side of the experiment vessel, the bearings 409b, 411b and shafts 605b, 607b are shown in an elevation view (without a cutaway). Internal shaft 605b associated with gauging vessel 405 extends through bearing 411b in the wall of second capsule member 103. External shaft 607b associated with mass vessel 407 extends through bearing 409b in the wall of first capsule member 101. Mass vessel 407 and gauging vessel 405 may therefore rotate about the lateral axis of the capsule members 101, 103 while maintaining physical separation between the two vessel halves as well as maintaining physical separation between the capsule members 101, 103. The above mounting structure of the experiment vessel within the capsule members and the capsule members within the body of the logging sonde are provided for the purpose of illustration only. Other configurations, components or arrangements may be conceived by a person of ordinary skill in the art without departing from the intended scope of this description.

The attenuation of the recoil force 604 transmitted from the mass vessel 407 and transferred to the gauging vessel 405 will now be described. The effect of gravity on an object's mass may be measured by observing the differential acceleration of the object due to gravity over time. To observe the acceleration of the object, a test mass 601 is repeatedly raised and then dropped in freefall allowing the force of gravity 603 to act on the mass 601 causing it to fall. To repeatedly raise the mass 601, an apparatus must be created that is capable of repeatedly lifting and dropping the mass 601. Based on Newton's third law of motion, the force 603 exerted on the mass 601 due to gravity has an equal and opposite force 604 on the structure supporting the mass in a direction opposite the force of gravity. This reactive force is known as recoil 604 and will transfer from the device structure to the walls of the mass vessel 407 holding the testing device. The force is transmitted throughout the wall of the mass vessel 707 in all directions 611 and transfers along the mass vessel 407 as it reaches bearings 409a, 409b in the walls of the first capsule member 101. The force is transferred via bearings 409a, 409b to the walls of first capsule member 101 as shown by arrow 613. As described in FIG. 2, first capsule member 101 comprises a solid portion (201 shown in FIG. 2) which provides increased mass and inertia to the first capsule member 101 and serves to absorb some the recoil force 604 and provide attenuation of a portion of the recoil force 604. The remaining force which was not attenuated in the mass of first capsule member 101 is transferred along the walls of the first capsule member 101 to the contact points at bearings 417a, 419a that provide contact between the first capsule member 101 and the logging sonde 401. The recoil force 604 is transferred through bearing 417a into the solid mass structure of logging sonde 401 as indicated by arrow 615. As described above, the logging sonde forms a pressure housing comprised of metal which, by way of example, may weigh hundreds of pounds. This mass provides inertia that further absorbs the recoil force 604 resulting in attenuation 617 of the force throughout the body of the logging sonde 401. As the force is transferred through the heavy walls of the logging sonde 401, a portion of the recoil force 401 is absorbed and further attenuated. Eventually, residual recoil force 604 is transferred from the logging sonde 401 body via contact paints at bearings 417b, 419b to the second capsule member 103 as shown at arrow 619. The residual force is transferred through the body of second capsule member 103 as shown by arrow 621. As described in FIG. 2, a solid portion (203 shown in FIG. 2) of the second capsule member provides mass and inertia to further attenuation the recoil force 604 while it is transferred through the second capsule member 103. The residual recoil force 604 is transferred across contact points between the second capsule member 103 and the gauging vessel 405 at bearing 411b. Thus, the only common point of contact for the mass vessel (i.e. force loop) and the gauging vessel (i.e. measurement loop) is the body of logging sonde 401 via bearings 417, 419. The recoil force 604 is directed through both capsule members 101, 103 and bearings 409, 411, 417, 419 as well as the mass of the logging sonde 401.

The embodiment described in FIG. 6 provides high attenuation of the recoil force 604, providing isolation of the mass and measurement loops sufficient to provide a signal to noise ratio that allows for meaningful experimental data. While one exemplary path taken by the recoil force 604 was described with regard to FIG. 6, it is noted that other paths are available through which the recoil force 604 may travel and be attenuated. A single path was labeled and described to maintain the clarity of the illustration and provide a better understanding of the function of the illustrated embodiment.

While the foregoing describes exemplary embodiments and implementations, it will be apparent to those skilled in the art that various modifications and variations can be made to the present invention without departing from the spirit and scope of the invention. For example, it is to be understood that the experiment and gauging halves may be interchanged or swapped, such that the experiment may reside in the lower half while the gauging structure may be defined as the upper half. Such variations are considered within the scope of the appended claims.

What is claimed is:

1. A decoupling capsule for hosting ultra-sensitive experiments in a logging sonde, the capsule comprising:
   a first capsule member;
   a second capsule member, substantially encapsulating and physically isolated from said first capsule member;
   a payload area common to said first and second capsule members and configured to receive an experiment vessel;
   a first bearing pair in contact with said first capsule member defining a longitudinal rotational axis along said first and second capsule members; and
   a second bearing pair in contact with said second capsule member, along the longitudinal rotational axis.

2. The decoupling capsule of claim 1, wherein the experiment vessel comprises two non-contacting vessels, wherein the first non-contacting vessel contains a force loop and the second non-contacting vessel contains a measurement loop.

3. The decoupling capsule of claim 2, wherein the first non-contacting vessel is coupled to one of said first or second capsule members through a third bearing pair, and the second non-contacting vessel is coupled to the other capsule member through a fourth bearing pair.

4. The decoupling capsule of claim 3, wherein said third and fourth bearing pairs are concentric and define a second rotational axis perpendicular to the longitudinal rotational axis.

5. The decoupling capsule of claim 4, wherein said first and second non-contacting vessels are coupled to their corresponding third and fourth bearing pairs by a shaft extending from each non-contacting vessel, wherein the shafts are concentrically oriented.

6. The decoupling capsule of claim 1, wherein said capsule is configured inside a logging sonde.

7. The decoupling capsule of claim 6, wherein said logging sonde is in contact with said first and second bearing pairs.

8. The decoupling capsule of claim 7, wherein the bearings are shock mounted to absorb recoil energy on its way out from the experiment to the pressure housing.

9. The decoupling capsule of claim 6, wherein said logging sonde is permanently emplaced for long-term monitoring applications.

10. The decoupling capsule of claim 6, wherein said logging sonde is clamped to well casings or lie flat on their inner walls in deviated sections, thereby effectively increasing the sonde's inertia.

* * * * *